Oct. 19, 1965   J. W. WELCH ETAL   3,212,238
APPARATUS FOR DEHYDRATING A NATURAL GAS STREAM
Filed May 1, 1961   2 Sheets-Sheet 1

JOHN W. WELCH &
THEODORE D. CLEARY
INVENTORS

BY

ATTORNEY

Oct. 19, 1965    J. W. WELCH ETAL    3,212,238
APPARATUS FOR DEHYDRATING A NATURAL GAS STREAM
Filed May 1, 1961    2 Sheets-Sheet 2
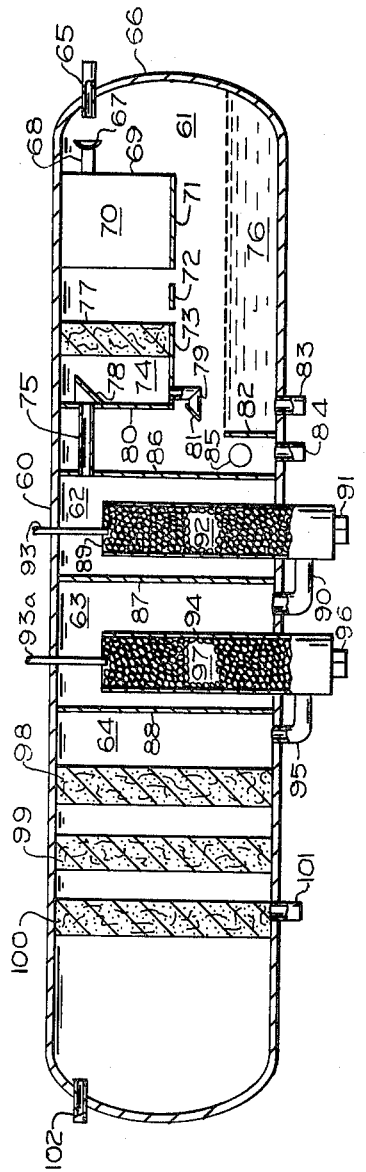
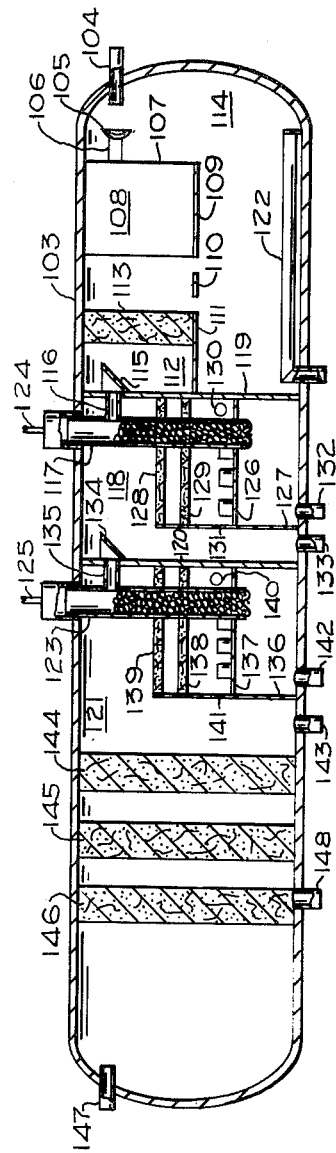
JOHN W. WELCH &
THEODORE D. CLEARY
INVENTORS
BY
ATTORNEY United States Patent Office 3,212,238
Patented Oct. 19, 1965

3,212,238
APPARATUS FOR DEHYDRATING A NATURAL GAS STREAM
John W. Welch, Oklahoma City, Okla., and Theodore D. Cleary, Boulder, Colo., assignors to Black, Sivalls & Bryson, Inc., Kansas City, Mo., a corporation of Delaware
Filed May 1, 1961, Ser. No. 106,718
2 Claims. (Cl. 55—208)

The present invention relates generally to an apparatus for the dehydration of a natural gas stream. More particularly, the present invention relates to an apparatus for the separation of liquids from a natural gas stream and the absorption of the water and water vapor therefrom.

Prior to the present invention most attempts to provide a horizontal contacting device for the dehydration of a natural gas stream have been commercially unsuccessful. In the dehydration of a gas stream by absorption of the water vapor from the stream best results are obtained when the most concentrated of the absorbent liquid is put into intimate contact with the stream immediately prior to the discharge of the gas stream from the contacting zone. This has been accomplished in prior systems by introducing the lean absorbent liquid from the reconcentrator into the upper portion of a vertical tower and introducing the gas stream to be dehydrated into the lower portion of this tower. The gas will rise and the liquids are allowed to flow downwardly over bubble trays or other suitable contacting devices providing a countercurrent contact between the gas and the liquid. It is well known that bubble trays have a contacting efficiency of about fifteen to twenty percent in glycol dehydration service while co-current contacting efficiencies are such that they closely approach a condition of one hundred percent equilibrium between the gas stream and the absorbent liquid being contacted. Counter-current contacting does have one advantage and that is that the leanest or most pure of the absorbent liquid is brought into contact with the driest of the gas in the system. In this way even though the liquid and gas do not approach equilibrium as closely as in a co-current contactor, the liquid is at a higher level of concentration allowing good dehydration. However, this conventional bubble tray approach requires about two or three times more counter-current contacts than the present invention. In most applications for the dehydration of a natural gas stream a preliminary separator or scrubber is required. The combination of this preliminary separator and the horizontal contacting device of the present invention has been found to be economical and to provide an efficient contacting device. Therefore, the primary object of the present invention is to provide a novel method and apparatus providing the benefits of both countercurrent contact and co-current contact between a natural gas stream and an absorbent liquid.

Another object of the present invention is to provide an apparatus of obtaining a countercurrent contact between a gas and a liquid or a co-current contact between the gas and liquid with the same device. A further object of the present invention is to provide a novel apparatus for providing contact between a gas stream and a liquid wherein such apparatus is in the form of a horizontal vessel. A still further object of the present invention is to provide a combination horizontal contacting device and separator for a natural gas stream dehydrator. Still another object of the present invention is to provide a system whereby a countercurrent contacting system in a natural gas dehydrator may be converted simply and quickly to a co-current contacting system by control of the dehydration pumping unit. Another object of the present invention is to provide a natural gas stream dehydrator in which contact of the stream with an absorbent liquid may be limited to one stage of contact when such one stage contact is particularly desirable, e.g., when the dehydration requirements are not strict as in summertime operation. A still further object of the present invention is to provide an intimate co-current contact between a natural gas stream and the absorption liquid wherein the leanest of the absorption liquid is in contact with at least partially dehydrated natural gas. Also, an object of the present invention is to provide an apparatus for dehydrating a natural gas stream in which a maximum dehydration of the natural gas stream is obtained with the absorbent liquid being used.

These and other objects of the present invention are fully accomplished in the system and apparatus of the present invention as shown in the accompanying drawings wherein:

FIG. 2 is a sectional view of another form of contacting vessel taken along a longitudinal vertical plane.

FIG. 3 is a similar sectional view of still another form of contacting vessel.

Figure 1:
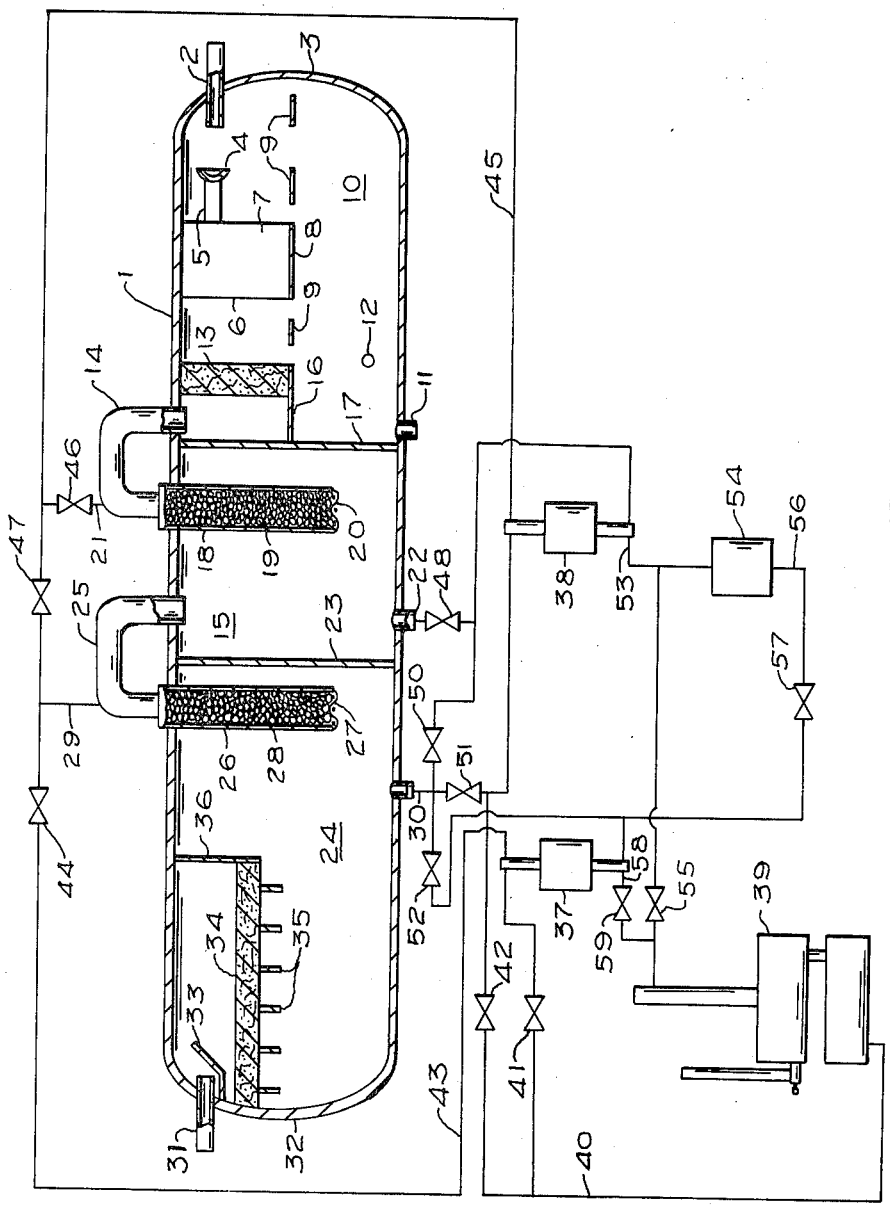
FIG. 1 is a schematic diagram of a system of the present invention showing details of the preferred form of contacting vessel in a vertical longitudinal sectional view.

Referring more in detail to the drawings:

The natural gas stream to be dehydrated by the apparatus and system illustrated in FIG. 1 is conducted into vessel 1 through inlet 2. Vessel 1 is a substantially horizontal vessel and should be designed to process the natural gas stream at the pressure of such natural gas stream. Inlet 2 connects substantially horizontally into one end of vessel 1 through head 3 and is directed toward the center of deflector baffle 4. Deflector baffle 4 is supported by braces 5 which extend from vertical vanes 6 within vane section 7. The lower portion of vane section 7 is closed by plate 8. Plates 9 extend across the interior of vessel 1 at the same level as plate 8 to provide a division between the upper and lower portions of separation section 10. This division allows a quiescent settling of the liquids in the lower portion of separation section 10 and will allow the water and hydrocarbons to collect in layers sufficient to discharge them separately from separation section 10 through water outlet 11 and hydrocarbon liquid outlet 12 under the control of the necessary valves (not shown). The gas flows through mist extraction element 13 and out of separation section 10 through pipe 14 which connects into contacting chamber 15. Plate 16 prevents gas from bypassing mist extraction element 13. Partition 17 extends vertically across the interior of vessel 1 to divide separation section 10 from contacting chamber 15.

Pipe 14 extends into contactor 18 which is filled with suitable contacting material 19 supported at the lower end of contactor 18 by screen 20. The lower end of contactor 18 is therefore open to the interior of contacting chamber 15. Line 21 connects into pipe 14 as shown in FIG. 1 as hereinafter more fully explained. Outlet duct 22 extends from vessel 1 to drain liquids collecting in contacting chamber 15. Partition 23 provides the dividing wall between contacting chamber 15 and contacting and separation section 24 of vessel 1. Pipe 25 extends from the upper part of contacting chamber 15 as shown and connects into contactor 26 which extends into the upper part of contacting and separation section 24. The lower end of contactor 26 is covered by screen 27 to support the contacting material 28 contained within contactor 26. Line 29 connects into pipe 25 directly above contactor 26 as shown. Outlet 30 extends from contacting and separation section 24.

Gas outlet duct 31 extends from vessel 1 through head 32. Baffle 33 protects the opening of gas outlet duct 31 within section 24. Mist extraction element 34 is secured within section 24 and is held in position by supports 35. Wall 36 is positioned to prevent any gas bypassing mist extraction element 34.

Pumps 37 and 38 are used to pump the absorbent liquid into the contacting devices of vessel 1 and the return of liquid from vessel 1 is connected through pumps 37 and 38 to dehydrating agent reconcentrator 39 to provide a balancing force for the pumps. Also, this return can be used with little additional gas to completely power the operation of pumps 37 and 38. Pumps 37 and 38 can be operated on any other source of power gas with or without balancing without departing from the scope of the present invention. Line 40 connects from reconcentrator 39 through valve 41 into the suction side of pump 37 and through valve 42 into the suction side of pump 38. Line 43 connects from the pumping side of pump 37 through valve 44 into line 29 and line 45 connects from the pumping side of pump 38 through valve 46 into line 21. Also, line 45 connects through valve 47 into line 29. Outlet 22 from contacting chamber 15 connects through valve 48 to the balance side of pump 38 and through valves 50 and 52 to the balance side of pump 37. Outlet 30 connects through valve 52 into the balance side of pump 37. Outlet 30 also connects through valve 51 into the suction side of pump 38. Line 53 connects from the outlet of the balance side of pump 38 into surge drum 54 and also connects through valve 55 into reconcentrator 39. Line 56 connects from surge drum 54 through valve 57 into the inlet of the balance side of pump 37. Line 58 connects from the outlet of the balance side of pump 37 through valve 59 into reconcentrator 39. The versatility of such system will be fully discussed in the discussion of the operation of the system of FIG. 1.

Vessel 60 illustrated in FIG. 2 is similar to vessel 1 of FIG. 1. It is horizontally positioned and comprises inlet separation section 61, contacting sections 62 and 63 and mist extraction section 64. Inlet 65 extends horizontally into vessel 60 through head 66 and is directed at the center of deflector baffle 67. Deflector baffle 67 is mounted by braces 68 secured to vanes 69 of vane section 70. The lower side of vane section 70 is closed by plate 71. Plate 72 extends horizontally across vessel 60 on the same level as plate 71 and provides a division between the upper and lower portions of inlet separation sections to form a relatively quiet zone below plates 71 and 72 to allow a two phase separation of liquids to be made within inlet separation section 61. Plate 73 also extends horizontally across the interior of vessel 60 and defines mist eliminator 74 and separates gas outlet 75 from inlet separation section 61 and from liquid collecting zone 76 within the lower portion of inlet separation section 61. Mist elimination element 77 extends across the portion of inlet separation section 61 above plate 73. Baffle 78 extends upwardly before gas outlet 75. Drain 79 extends downwardly from mist eliminator 74 through partition 80 and is closed by closure 81. Closure 81 should be designed to prevent gas in inlet separation section 61 from bypassing mist elimination element 77 and to allow the draining of collected liquids from mist eliminator 74 through drain 79 into liquid collecting zone 76 between first liquid outlet 83 and second liquid outlet 84. Normally, first liquid outlet 83 will be used to discharge the water separated from the fluid stream being processed and second liquid outlet 84 will be used to discharge the liquid hydrocarbons which have been separated from the stream. Float 85 is used to control the discharge of liquids collecting on the downstream side of overflow weir 82 through second liquid outlet 84. Suitable control device (not shown) should be provided to control the discharge of water from vessel 60 through first liquid outlet 83.

Partition 86 is positioned vertically in vessel 60 and divides inlet separation section 61 from first contacting section 62. Gas outlet 75 extends both through partition 80 and through partition 86 to conduct the gas stream from inlet separation section 61 into first contacting section 62. Partition 87 is positioned vertically in vessel 60 and separates first contacting section 62 from second contacting section 63. Partition 88 also is vertically positioned within vessel 60 and defines the boundary between second contacting section 63 and mist extraction section 64.

Within first contacting section 62 is contactor 89 which extends downwardly through the lower portion of vessel 60 and is open to the interior of first contacting section 62. Gas duct 90 extends from the portion of contactor 89 below vessel 60 and connects into second contacting section 63. Plug 91 closes the lower portion of contactor 89 but can be removed to drain contactor 89 or to replace contacting material 92. Liquid duct 93 extends into first contacting section 62 and into the interior of contactor 89 to discharge liquid absorbent into contactor 89 for intimate contact between the gas stream and the absorbent liquid.

Similarly, within second contacting section 63 is contactor 94 which extends downwardly through the lower portion of vessel 60 and is open to the interior of second contacting section 63. Liquid duct 93a extends into contactor 94 to discharge liquid absorbent into contactor 94. Gas duct 95 extends from the portion of contactor 94 below vessel 60 and connects into mist extraction section 64. Plug 96 closes the lower portion of contactor 94 but can be removed to drain contactor 94 or to replace contacting material 97.

Within mist extraction section 64 are mist extraction elements 98, 99 and 100, each positioned vertically across the interior of vessel 60 as shown. Liquid outlet 101 and gas outlet 102 extend from vessel 60 as shown in FIG. 2.

Vessel 103 as shown in FIG. 3 is still another form of combined separating and contacting apparatus of the present invention and has an inlet 104 which extends into vessel 103. Inlet 104 is directed at the central portion of deflector baffle 105. Deflector baffle 105 is supported by braces 106 secured to vanes 107 within vane section 108 which is defined by plate 109 and the upper inner surface of vessel 103. Plate 110 is positioned horizontally across the interior of vessel 103 at the same level but spaced from plate 109. Plate 111 which forms the lower surface of mist elimination section 112 is also horizontally positioned at the same level as plates 109 and 110 and spaced therefrom as shown. Mist elimination element 113 is positioned between plate 111 and the upper interior surface of vessel 103 to cause all of the gas flowing from separation section 114 of vessel 103 to flow through mist elimination element 113. The gas within mist elimination section 112 flows over baffle 115 and is conducted through gas outlet duct 116 into contactor 117 within first contacting section 118. Partition 119 divides separation section 114 from first contacting section 118. Partition 120 separates first contacting section 118 from second contacting section 121. Both partition 118 and partition 120 are vertically positioned within vessel 103. Drain tube 122 is positioned within the lower portion of separation section 114 to drain the separated liquids therefrom.

The contacting material within contactor 117 and contactor 123 is of a type normally suitable for providing intimate contact between the gas flowing therethrough and the absorbent liquid which is injected therein. Line 124 connects into contactor 117 and line 125 connects into contactor 123 to conduct the absorbent liquid into contactors 117 and 123. The lower portion of contactor 117 is open with suitable screening or other device (not shown) to retain the contacting material within contactor 117 and to allow the contacted gas and absorbent liquid to flow therefrom into the lower portion of first contacting section 118. Bubble tray 126 is positioned above the lower outlet of contactor 117 and extends from partition 119 to partition 127. Partition 127 is positioned vertically between partitions 119 and 120 and extends upwardly from the lower inner surface of first contacting section 118 of vessel 103 and terminates at a position below the upper inner surface of section 118. Mist eliminators 128 and 129 are both positioned above bubble tray 126 between partition 119 and partition 127. Liquid absorbent inlet 130 extends into first contacting section 118 just above bubble tray 126 to provide a supply of liquid absorbent on tray 126. Slot 131 is provided in partition 127 at a height above bubble tray 126 to maintain the desired level of liquid on bubble tray 126. Drain connections 132 and 133 are provided on opposite sides of partition 127 to discharge the collected liquids from the lower portion of section 118. Gas flows out of section 118 over baffle 134 and through gas outlet duct 135 into contactor 123 within second contacting section 121. Contacting section 121 is constructed similar to section 118 and has partition 136 spaced from partition 120 to provide support for bubble tray 137 and mist eliminators 138 and 139. Liquid absorbent inlet 140 extends into section 121 at a position just above bubble tray 137 and slot 141 in partition 136 is positioned to maintain the desired level of absorbent liquid on bubble tray 137. Drain connections 142 and 143 are provided to discharge the liquids from section 121. As shown, drain connections 142 and 143 are on opposite sides of partition 136.

Mist extraction elements 144, 145 and 146 are positioned between second contacting section 121 and gas outlet 147. Liquid outlet 148 connects into the lower portion of vessel 103 as shown to drain liquids from vessel 103 which have been removed from the gas stream by mist extraction elements 144, 145 and 146.

In operation, the flow of the gas stream being processed by the system shown in FIG. 1 is through inlet 2 of vessel 1 and against deflector baffle 4, through vane section 7, mist extraction element 13 and pipe 14 into contactor 18. Liquid absorbent is pumped into contactor 18 through line 21 and valve 46 as hereinafter more fully described. The gas stream is intimately contacted by the liquid absorbent within contactor 18. The gas flows from contactor 18, through contacting chamber 15 and pipe 25 into contactor 26 within contacting and separating chamber 24. Liquid absorbent is pumped into contactor 26 through line 29 as hereinafter more fully described to be intimately contacted with the gas stream therein. The gas stream leaving contactor 26 flows through mist extraction element 34 and from vessel 1 through gas outlet duct 31.

Liquids separated from the inlet stream are discharged from vessel 1 through water outlet 11. The absorbent liquid is discharged from vessel 1 through outlets 22 and 30.

When it is desirable that the absorbent liquid injected into contactor 26 be lean and the absorbent liquid injected into contactor 18 be partially rich, then the absorbent liquid will be drawn from reconcentrator 39 through line 40 and valve 41 into pump 37. This lean absorbent liquid is pumped by pump 37 through line 43, valve 44 and line 29 into contactor 26. The liquid absorbent discharged from vessel 1 through outlet 30 will flow through valve 51 to pump 38 and be pumped through line 45, valve 46 and line 21 into contactor 18. The liquid absorbent discharged from contacting chamber 15 will flow through line 22 and valve 48 into pump 38 to either power pump 38 by drawing excess gas from vessel 1 or will by maintaining the pressure on the liquid absorbent provide a balancing force for pump 38 by taking the drop in pressure through pump 38 thereby reducing the pumping costs considerably. The liquid absorbent flows from pump 38 through surge rum 54, line 56, valve 57 into pump 37. By taking only a portion of the pressure drop available in the pressure difference between the pressure within vessel 1 and the pressure of reconcentrator (which normally will be atmospheric pressure) liquid absorbent under pressure will be accumulated within surge drum 54. The liquid absorbent flowing through pump 37 will assist in the powering of pump 37 either by balancing or by the utilization of gas withdrawn from vessel 1 through outlet 22. The liquid absorbent flowing from pump 37 flows through line 58 and valve 59 into reconcentrator 39.

When it is desirable that the absorbent liquid injected into contactors 18 and 26 should be lean absorbent liquid, both pumps 37 and 38 will be connected to pump lean absorbent liquid from reconcentrator 39 with pump 37 pumping into contactor 26 and pump 38 pumping into contactor 18. The lean absorbent liquid will flow through line 40 from reconcentrator 39 through valve 41 to pump 37 and through valve 42 to pump 38. Pump 37 will deliver the liquid absorbent through line 43, valve 44 and line 29 into contactor 26. The liquid absorbent discharged from section 24 will flow through outlet 30 and valve 52 into the balancing or power portion of pump 37 depending on whether the rich liquid absorbent is to be used for balancing or powering the pumping. Pump 38 will deliver the lean absorbent liquid through line 45, valve 46 and line 21 into contactor 18. The rich liquid absorbent which is discharged from contacting chamber 15 through outlet 22 will flow through valve 48 into pump 38 for powering or balancing pump 38 as previously explained. The absorbent liquid is delivered from pump 38 through line 53 and valve 55 to reconcentrator 39.

Referring to the device illustrated in FIG. 2 the flow of the gas stream is similar to the flow through vessel 1 of FIG. 1. The gas is conducted into vessel 60 through inlet 65 and is deflected by deflector baffle 67. The gas stream flows through vane section 70 and mist elimination element 77, over baffle 78 and through gas outlet 75 into first contacting section 62. The liquids collecting in the lower portion of inlet separation section 61 are allowed to stratify and the lighter liquid hydrocarbons will overflow weir 82 and be discharged through liquid outlet 84 while the heavier liquid such as water will be discharged through liquid outlet 83.

The gas stream will be intimately contacted in cocurrent contact with the absorbent liquid within contactor 89, the absorbent liquid being injected into contactor 89 through liquid duct 93. The gas stream, after contact, flows from contactor 89 through gas duct 90 into second contacting section 63 where it is again intimately contacted by absorbent liquid within contactor 94. The absorbent liquid is injected into contactor 94 through liquid duct 93a. After intimate contact with the liquid absorbent in contactor 94, the gas flows through gas duct 95 into mist extraction section 64 where it flows through mist extraction elements 98, 99 and 100 and out of vessel 60 through gas outlet 102.

The main gas stream flows into vessel 103 through inlet 104 and is deflected by deflector baffle 105. The gas stream then flows through vane section 108, mist elimination element 113 and through gas outlet duct 116 into contactor 117. The liquids separated from the main gas stream in separation section 114 are discharged through drain tube 122. Intimate contact is provided by the contacting material within contactor 117 between the gas stream and the liquid absorbent which is injected into contactor 117 through line 124. The gas flows from contactor 117 under bubble tray 126 and is again contacted with liquid absorbent on bubble tray 126. Liquid absorbent is injected onto bubble tray 126 through liquid absorbent inlet 130 and overflows through slot 131 in partition 127. Bubble tray 126 provides a small additional contact between the gas and absorbent liquid and will also assist in the reduction of the amount of liquid absorbent carried in the gas stream from contactor 117. Mist eliminators 128 and 129 remove the majority of the entrained liquids from the gas stream flowing from bubble tray 126 through gas outlet duct 135 to contactor 123. Liquids are discharged from first contacting section 118 through drain connections 132 and 133. Contactor 123 is similar to contactor 117. Liquid absorbent is injected into contactor 123 through line 125 and contactor 123 extends below bubble tray 137. Liquid absorbent is injected onto bubble tray 137 through liquid absorbent inlet 140 and overflows through slot 141 in partition 136. Both bubble tray 137 and mist eliminators 138 and 139 are provided to remove a substantial portion of the entrained liquids from the gas stream. Further removal of mist from the gas stream is accomplished by mist extraction elements 144, 145 and 146. The gas stream is discharged from vessel 103 through gas outlet duct 147. Any liquids collecting in the lower portion of the section of vessel 103 containing mist extraction elements 144, 145 and 146 are discharged therefrom through liquid outlet 148.

From the foregoing it can be seen that the present invention provides an apparatus for dehydrating a natural gas stream wherein the separation and contacting devices are combined within one structure and in which advantage is taken of the increased contacting efficiency obtained in a co-current contacting device. Further, the present invention provides two stages of co-current contact and will supply both stages with lean absorbent liquid from the reconcentrator or will supply the lean liquid from the reconcentrator only to the second stage of contacting and use the partially rich absorbent liquid from the second stage of contacting for the first stage of contacting.

What we claim and desire to secure by Letters Patent is:

1. A natural gas dehydrator comprising,
a horizontally positioned vessel,
a gas stream inlet into said vessel,
separation means within said vessel,
a plurality of co-current contactors positioned vertically and substantially wholly within said vessel,
means conducting said gas from said separation means to said contactors,
absorbent liquid inlets into said contactors,
absorbent liquid outlets from said contactors,
means flowing gas and liquid co-currently through said contactors,
a gas outlet from said vessel,
a liquid outlet from said vessel,
absorbent liquid reconcentration means,
pumping means to pump absorbent liquid from said reconcentration means into said contactors, and
means connecting said outlet for absorbent liquid from said vessel to said reconcentration means,
said pumping means comprising,
a pair of absorbent liquid pumps,
means connecting the inlets of said pumps to said absorbent liquid reconcentrating means,
means connecting the outlet of one of said pumps to the absorbent liquid inlet of said second co-current contactor,
means connecting the outlet of the other of said pumps to the absorbent liquid inlet of said first co-current contactor,
means connecting the outlet of said second co-current contactor to said inlet of said other of said pumps,
a first valve means in said means connecting the outlet of said second co-current contactor to said inlet of said other of said pumps, and
a second valve means in said means connecting the inlet of said other of said pumps to said absorbent liquid reconcentrating means.

2. A natural gas dehydrator comprising,
a horizontally positioned vessel,
a gas stream inlet into said vessel,
a first co-current contactor positioned within said vessel,
a second co-current contactor positioned within said vessel,
means connecting said gas stream into said first co-current contactor,
means conducting gas from said first co-current contactor to said second co-current contactor,
a first pump,
a second pump,
an absorbent liquid reconcentrator,
means connecting the inlets of said first and second pumps to said absorbent liquid reconcentrator,
a first liquid outlet from said first co-current contactor,
a second liquid outlet from said second co-current contactor,
means connecting said first liquid outlet to said absorbent liquid reconcentrator,
means connecting said second liquid outlet to the inlet of said second pump,
means connecting the liquid outlet of said first pump to the liquid inlet of said second co-current contactor,
means connecting the liquid outlet of said second pump to the liquid inlet of said first co-current contactor,
valve means in said means connecting from the absorbent liquid reconcentrator to the inlet of said second pump, and
valve means in said means connecting from said second liquid outlet from said second co-current contactor to the liquid inlet of said second pump.

References Cited by the Examiner
UNITED STATES PATENTS

| Re. 24,433 | 2/58 | Lavery | 55—32 X |
| 850,680 | 4/07 | Smith | 55—30 |
| 2,235,322 | 3/41 | Martin | 55—31 |
| 2,280,633 | 4/42 | Crawford | 55—31 X |
| 2,735,506 | 2/56 | Glasgow | 55—355 X |
| 2,812,827 | 11/57 | Worley et al. | 55—32 |
| 2,910,136 | 10/59 | Valliant et al. | 55—174 |
| 2,990,910 | 7/61 | Kimmell | 55—32 |
| 3,094,574 | 6/63 | Glasgow et al. | 261—114 |
| 3,119,674 | 1/64 | Glasgow et al. | 55—32 X |
| 3,132,987 | 5/64 | Sinex | 55—32 X |

REUBEN FRIEDMAN, *Primary Examiner.*

HERBERT L. MARTIN, *Examiner.*